METHOD AND MEANS FOR VENEER BRICK
Filed April 7, 1955 4 Sheets-Sheet 1
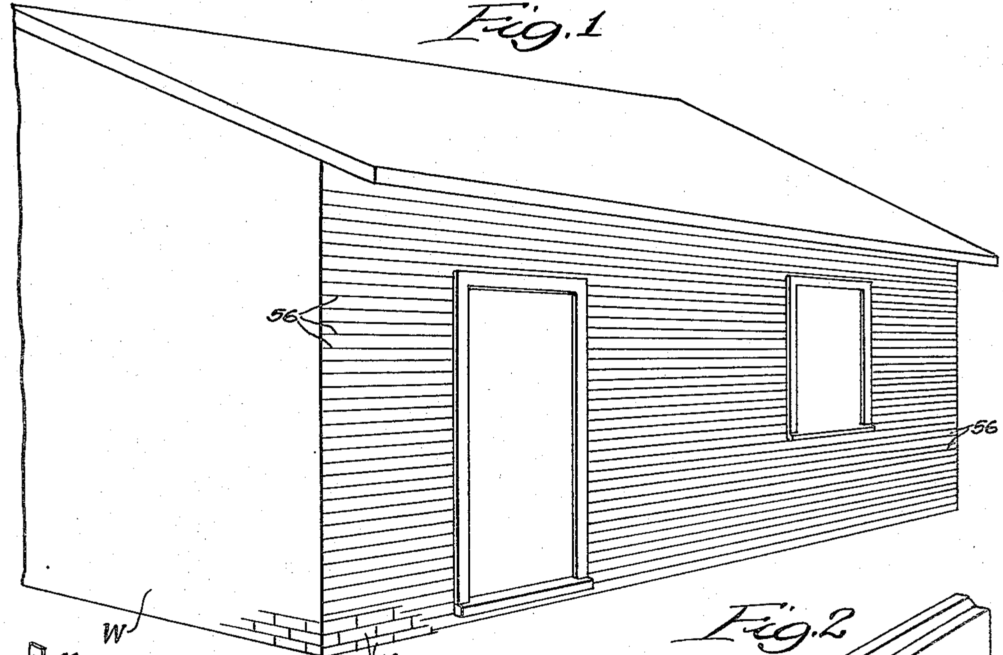
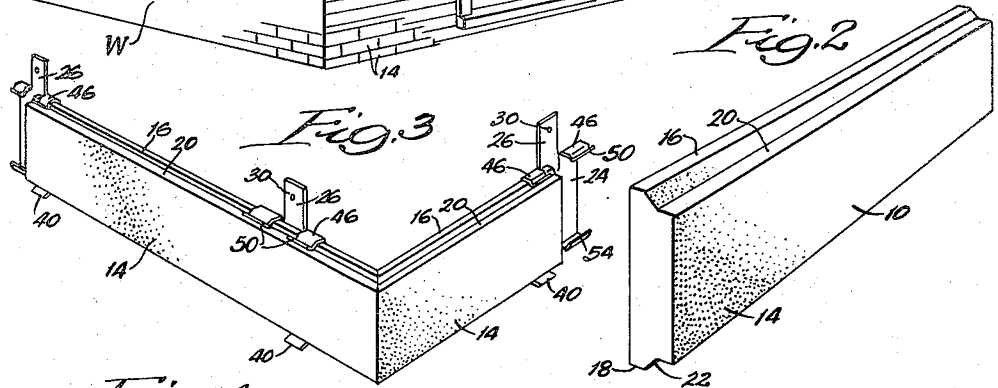
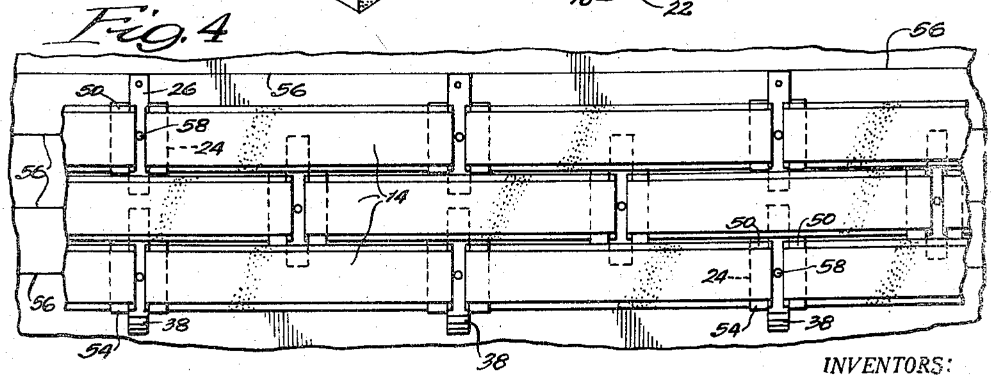
INVENTORS:
ROBERT B. TAYLOR
S. EUGENE HUBBARD
& PAUL V. JOHNSON
BY Owen, McDougall, Williams & Hersh,
ATTORNEYS.

METHOD AND MEANS FOR VENEER BRICK
Filed April 7, 1955 4 Sheets-Sheet 2
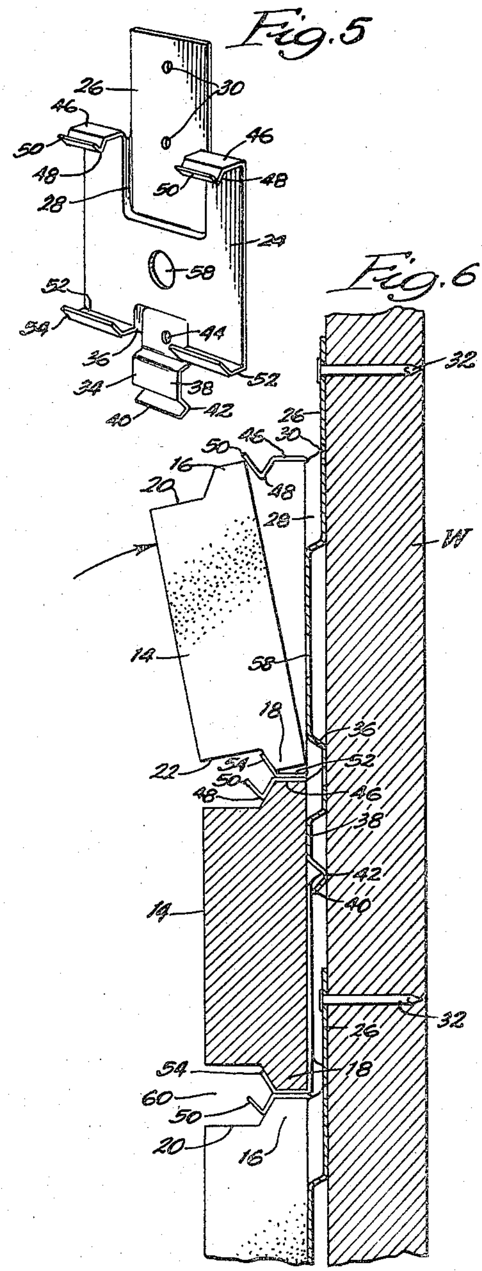
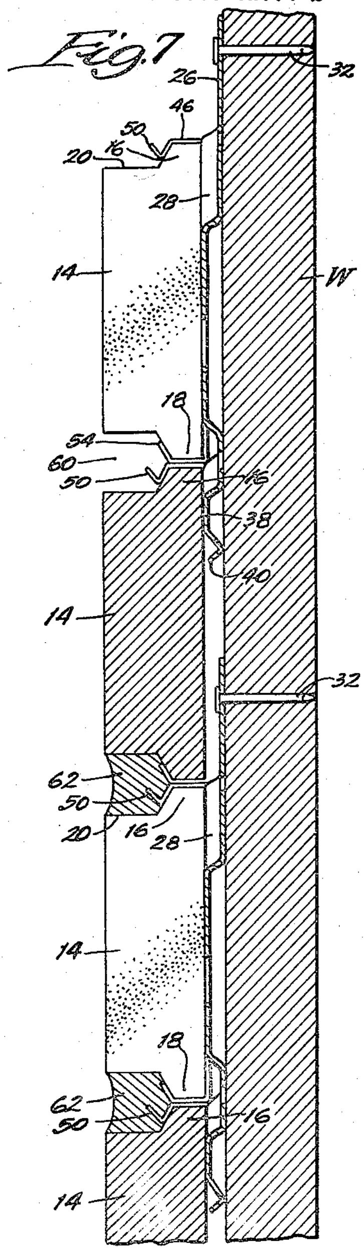
INVENTORS:
ROBERT B. TAYLOR,
S. EUGENE HUBBARD &
PAUL V. JOHNSON
Owens, McDougall, Williams & Hersh,
ATTORNEYS.

Feb. 16, 1960 R. B. TAYLOR ET AL 2,924,963
METHOD AND MEANS FOR VENEER BRICK
Filed April 7, 1955 4 Sheets-Sheet 3
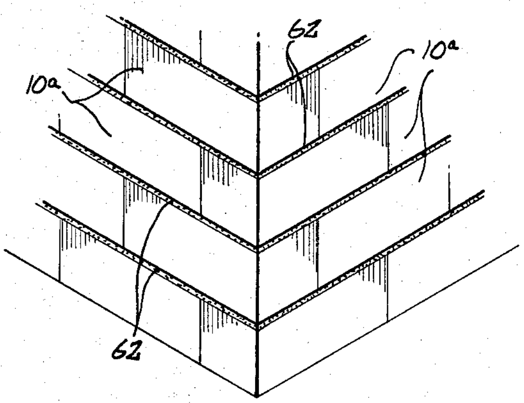
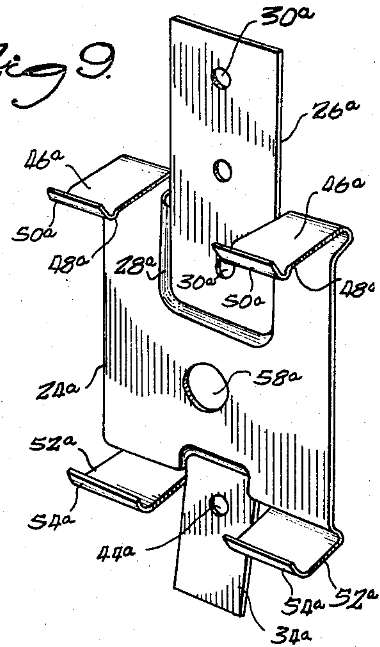
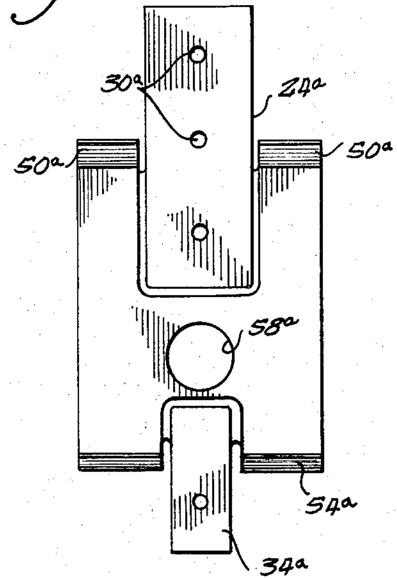
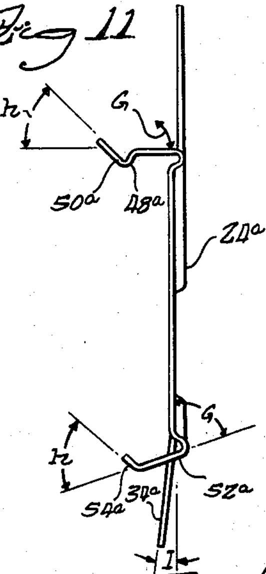
Inventors
Robert B. Taylor
S. Eugene Hubbard
Paul V. Johnson
Jack E. ...
Attorneys

METHOD AND MEANS FOR VENEER BRICK

Filed April 7, 1955

Inventors
Robert B. Taylor
S. Eugene Hubbard
Paul V. Johnson

Attorneys

United States Patent Office 2,924,963

Patented Feb. 16, 1960

2,924,963

METHOD AND MEANS FOR VENEER BRICK

Robert B. Taylor, Elmhurst, S. Eugene Hubbard, Chicago, and Paul V. Johnson, Park Forest, Ill., assignors to Structural Clay Products Research Foundation Application April 7, 1955, Serial No. 499,814

5 Claims. (Cl. 72—19)

The present invention relates to the construction industry. Generally, the invention relates to a new method and means for using structural clay products by applying a brick veneer to pre-existing walls. One specific application provides for attaching a clay veneer brick wall to existing frame dwelling units. This application forms a continuation-in-part of United States Patent Application, Serial No. 353,562, filed May 7, 1953, now abandoned.

The invention is primarily directed to the renovation of walls or similar supports in existing buildings. There has been a large demand by the public in this field which has resulted in the use of a vast number of different products and methods to meet this demand. Many of the products introduced and used are imitations of structural clay units such as brick. Since these products are made of materials that do not have the weathering properties of clay units, their appearance of similarity to clay products fails after they have been attached to a wall for a short period of time. The invention, therefore, contemplates the use of structural clay in the form of veneer brick in order that the desirable characteristics of clay products be attained.

Accordingly, it is the general object of the invention to provide a new and efficient method for attaching a new form of clay veneer brick to a wall. A related and more specific object of the invention is the provision of unique brick veneering elements which afford a wide flexibility in application of the veneer to pre-existing buildings.

A further object of the invention is to furnish a clay brick unit and co-operating clip which accommodate realistic manufacturing and erection tolerances.

Still another object of the invention is to provide a method of veneering a pre-existing wall which is susceptible of extensive mechanization thereby minimizing the extent of skilled labor required in erection.

Yet a further object of the invention is to provide a unique extrudible mortar which insures an excellent bond, seal and key at a greatly reduced application cost over conventional mortar.

Another important object of the invention is to provide a brick veneer wall which has the characteristic of fired clay products and the normal appearance of a brick wall.

Further objects and advantages of the present invention will become apparent as the following description proceeds, taken in conjunction with the appended drawings, in which:

Figure 1 is a perspective view showing a portion of a building which has been lined to receive the new form of clay veneer brick units.

Fig. 2 is a perspective view of the veneer brick unit.

Fig. 3 is a perspective view of a preferred form of corner piece of the veneer brick.

Fig. 4 is a front elevation view showing a number of the veneer brick units attached to a wall.

Fig. 5 is a perspective view of one embodiment of a clip for attaching the veneer brick units to a wall.

Fig. 6 is an enlarged partial side elevational view in cross-section showing how the new veneer brick units are secured to the clips attached to a wall.

Fig. 7 is a side elevational view in enlarged partial section showing, in part, a complete veneer brick wall.

Fig. 8 is a broken perspective view of a corner showing an alternative type corner joint of the veneer brick units.

Fig. 9 is an enlarged perspective view of an alternative form of clip.

Fig. 10 is a front elevation of the alternative form of clip illustrated in Fig. 9.

Fig. 11 is a side elevation of the alternative form of clip shown in Fig. 10.

Figure 12:
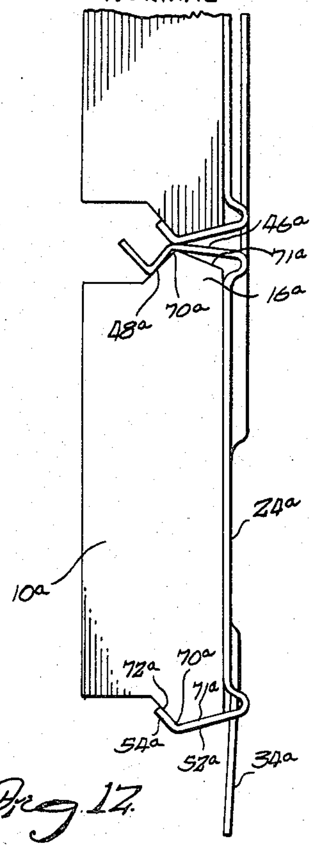
Figs. 12, 13 and 14 are side elevational views on an enlarged scale showing, respectively, a normal, undersized and oversized veneer brick unit employed with the alternative form of clip illustrated in Figs. 9, 10 and 11.

In broad outline, the invention contemplates the use of unique, individual clips having resilient clamping portions which receive and secure a new veneer brick. The veneer brick unit has a form and content rendering it receptive to easy fastening to the clips. The brick and clips are co-operatively proportioned to provide joints which can be filled from a gun with a specially developed mortar. When completed, an ordinary frame wall will have the appearance and weathering characteristics of a solid brick wall.

METHOD OF ERECTING THE WALL

The method contemplates use upon wooden or similar type walls, generally indicated by the letter W. Before attaching the clips 24 and the veneer brick 10 to the walls W, we recommend that the walls be horizontally lined with chalk or other similar markings 56, the distance between each of the markings 56 being the distance between the longitudinal ribs 16 and 18 of the bricks 10. These markings serve as a useful guide in attaching our clips 24 and brick units 10 to the wall as well as to greatly accelerate the speed with which the units can be attached to the wall.

It is also recommended as a means for accelerating the building of a veneer wall that before the first course of veneer brick units 10 are attached to the wall, one of the clips 24 be attached to one end of the brick 10 so that the end of the brick veneer 10 extends substantially halfway upon the clip 24 as shown in Fig. 3. The brick 10 is attached to the clip by merely forcing the ribs 16 and 18 between the lips 48 and 54 of the resilient clamping members 46 and 52. After the brick unit 10 has been inserted into the clip 24, the clip 24 is secured to the wall W by driving nails 32 through the openings 30 of the clip 24. It has been found that the method for laying up the clips 24 and brick units 10 is greatly facilitated by lining up the top of the lug 26 with each of the chalk marks 56 as shown in Fig. 4 of the drawings. Also, it is easier and faster to build the veener wall from the very bottom part up.

In attaching the first course of veneer brick units 10, it is normally desirable to secure the tail lug 34 to the wall W by driving nails 32 through the opening 44 of the tail lug 34 in order to adequately attach the clip 24 to the wall. It may even be necessary and desirable to drive a nail 32, or similar securing means, through the central opening 58 located in the main body of the clip 24.

After the first course of veneer brick units 10 are attached to the wall W, the tail lugs 34 of the clips 24 are inserted between the first course of veener brick units 10 and the wall W. If it is desired to have a "running bond" pattern effect, the tail lug 34 of the clip 24 is inserted substantitally midway of the secured veneer brick unit 10 (Fig. 4). The clips 24 may be inserted with the brick units 10 attached or unattached. The clip and brick units 10 are then secured to the wall W by driving nails 32 through the openings 30 of the lug 26. Of course, the clips 24 may first be secured to the wall before inserting the brick units 10 without departing from our prescribed method. This process is repeated until the brick veneer wall has been finished.

In order to accommodate a pattern effect of the "stack bond" type, which would require the clips 24 to be installed one over the other, the lug 26 has been drawn to permit the tail lug 34 to be inserted over the lug 26.

A veneer brick unit 10 to accommodate the corners of a building in order to preserve the appearance of normal brickwork is shown in Figs. 1 and 3. It is similar in all respects to the brick unit 10 except that the ends of two brick units 10 are mitered at right angles to each other. One of the bricks 10 may be half the length of the other brick unit 10 if a "running bond" pattern effect is desired throughout the building. To insure that the brick unit 10 is properly secured to the wall W, an extra clip 24 may be attached to the veener brick unit 10 near the corner and secured to the wall W in the usual fashion. Alternately, the corners of a building may be accommodated by the use of two veneer brick units 10 mitered to fit either by the manufacturer or the installer. One of the bricks 10 may be half of the length of the other bricks 10 if it is desired to approximate the appearance of solid brick masonry. When mitered joints are not employed, the overlapping effect illustrated in Fig. 8 results.

Because the lug 26 and the tail lug 34 are provided with draws, the brick units 10, when they are secured to the wall W, are spaced apart from the wall W by the depth of the draws of the lug 26 and tail lug 34. The purpose of this is to accommodate for irregularities which might occur because of the heads of the nails 32 and also to provide an air space which can act as insulation. Such air spaces also allow for the drainage of any water which may penetrate the veneer joints.

After the brick units 10 have been secured to the wall W (see Figs. 6 and 7), it is to be noted that the grooves 20 and 22 of each of the brick units 10 form a joint 60 into which mortar 62 can be placed. The mortar serves the purposes of integrally securing the brick units 10 as well as to give the veneer brick wall the appearance of a normal brick wall. The mortar 62 also serves to bury and hide the protruding lips of the clamping members 46 and 52.

By employing a unique mortar, the composition of which will be detailed later, the mortar can be extruded from a gun into the joints 60 between the brick units. Employing an extrusion gun provides for even and speedy application of mortar. Subsequently, a trowel or grooving tool may be used to contour the joints.

THE ELEMENTS

Three elements combine in the unique wall veneer contemplated by the present invention: a brick unit, a wall clip and mortar. Each of these three elements have particular general and detailed features which render them jointly and severally unique. Each of the elements will be detailed separately as the description proceeds. Their combined function will be more fully appreciated as employed in the method outlined above.

*The brick unit*

Referring to the drawings, the new clay veneer brick unit is best shown in Fig. 2 and is generally indicated by the numeral 10. The veneer brick unit 10 is preferably made according to the methods and procedures well known for making bricks of the usual type and dimensions. The veneer brick 10 is preferably of modular size. The veneer brick 10 comprises a back side 12 and a face section 14. At the top and bottom of the veneer brick 10, longitudinal ribs 16 and 18 are provided which are preferably beveled at their forward side at substantially a 45° angle, as shown in Fig. 2 of the drawings. Grooves 20 and 22 are therefore provided adjacent the ribs 16 and 18, the importance of which will be described later.

Figure 15:
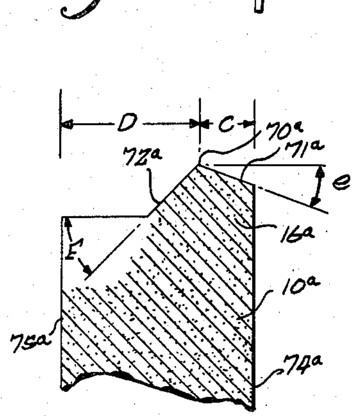
Fig. 15 is an enlarged side elevation of an edge of an alternative form of clay brick veneer unit illustrating its angularity and proportions.

An alternative form of the brick 10*a* is illustrated in detail in Fig. 15. The alternative form differs principally from the form of brick unit illustrated in Fig. 2 in the modification of the longitudinal rib 16 into a ridged rib 16*a* of specific proportion. The longitudinal rib 16*a* is made up of two sloping faces, a rear face 71*a* and a forward face 72*a* meeting at a ridge line 70*a*. The distance (*c*) from the ridge 70*a* to the rear face of the brick tile unit 74*a* is 50 percent of the distance (*d*) from the ridge 70*a* to the front face 75*a* of the alternative form of brick unit. The rearward slope angle (*e*) of the rear face 71*a* of the rib 16*a* is approximately 15°. The forward slope of the forward face 72*a* of the rib 16*a* is at an angle (*f*) with the horizontal approximating 45°. In practice, the thickness of the brick unit, the sum of the distances (*d*) and (*c*) will approximate ¾ of an inch. The width of the alternative form of brick unit from the top ridge 70*a* to the bottom ridge approximates 2½ inches.

Because the manufacture of brick will vary from plant to plant with the nature of the molds, the type of clay employed, variations in the firing temperatures of the kiln, and the like, these dimensions may vary in practice. The particular design of the alternative embodiment of the brick 10*a* as shown in Fig. 15 co-operates with the alternative design of clip, to be described later, to accommodate a tolerance in dimension of ⅛ of an inch in the distance from ridge to ridge of the brick tile unit.

*The clip*

The clip comprising a part of the invention is best shown in Fig. 5 of the drawings and is generally indicated by the numeral 24. The clip 24 may be made of any desired type of sheet metal, so long as it has the strength to resiliently receive and secure the veneer brick unit 10.

The clip 24 has an upstanding lug 26 at its uppermost part which extends some distance beyond the top of the clip 24. Preferably the lug 26 has a shallow draw as at 28, the reason for which will be pointed out hereinafter. The lug 26 is provided with a plurality of openings 30 which are designed to receive nails 32 or other similar securing means.

At the bottom part of the clip 24, a tail lug 34 is provided which also has a shallow draw as at 36. The lug 34 is bent outwardly until it provides a flat surface 38 which is in the same plane as the main body of the clip 24. The lug 34 is bent downwardly at 40 to provide a bearing surface 42 which is in the same plane as the lug 34. The tail lug 34 is also provided with an opening 44 to receive securing means such as nails 32 in the event that they are necessary.

Extending substantially perpendicular from the top of the main body of the clip 24 are a plurality of resilient clamping members 46. The clamping members 46 are located outwardly from the lug 26 and at the sides of the clip 24. Each of the clamping members 46 is provided with a down-turned lip 48 to resiliently receive the rib 18 of the brick 10 as best shown in Figs. 7 and 8. The lip 48 may also be provided with an up-turned flange 50 which, when the clip is fitted to the veneer brick, rides against the rib 16 of the veneer brick, causing the lip 48 to deflect and resiliently retain the veneer brick 10. The up-turned flange 50 also serves to help retain mortar in the joints between the veneer brick 10 when they are attached to a wall.

Mounted substantially perpendicular to the bottom portion of the clip 24 is another pair of resilient clamping members 52 which terminate in an up-turned lip 54 which resiliently receives the rib 18 of the brick 10. When the veneer brick 10 is secured to the clip 24, the lips 48 of the clamping members 46 and the lips 54 of the clamping members 52 bear against the beveled surface of the ribs 16 and 18 which securely retain the brick 10 to the clip 24.

An alternative form of clip is shown in detail in Figs. 9, 10 and 11. This clip is especially adapted to co-operate with the alternative form of brick shown in Fig. 15 and described above. This coaction makes possible a tolerance of ⅛ of an inch from ridge to ridge in the dimensions of the brick unit. In the later discussions of Figs. 12, 13 and 14, the operative details of design effecting this tolerance will become fully apparent.

Referring now to Fig. 9, it will be seen that the basic elements of the alternative clip 24*a* are those present in the clip 24 described above and shown in Fig. 5. The alternative form of clip 24*a* may be made of any desired type of sheet metal, so long as it has the strength to resiliently receive and secure the veneer brick unit 10, 10*a*. A 24-gauge galvanized steel has been found satisfactory in one commercial adaptation.

The alternative clip 24*a* has an upstanding lug 26*a* with a shallow draw 28*a* and a plurality of openings 30*a* which are designed to receive nails 32 or other similar securing means. A tail lug 34*a* at the bottom of the clip is provided but differs from the clip described above in that the surface is flat but angling downwardly. The tail lug 34*a* is provided with an opening 44*a* to receive securing means, such as nails 32 in the event they become necessary.

A plurality of resilient clamping members 46*a* extend forwardly and outwardly from the lug 26*a* at the sides of the clip 24*a*. A down-turned lip 48*a* is provided to resiliently receive the ridge 70*a* of the modified brick unit 10*a*. Also the brick unit 10 may be employed similarly.

An up-turned flange 50*a* is provided to ride against the rib 16 of the veneer brick unit causing the lip 48*a* to deflect and resiliently receive the veneer brick unit after it is pressed into position. The up-turned flange 50*a* also serves to help retain the mortar between the joints. The angularity of the lip 48*a* and the flange 50*a* has been shown respectively as angles ($g$) and ($h$) (see Fig. 11). The lip 48*a* extends downwardly at an angle approximating 60° with the horizontal. The flange 50*a* extends upwardly at an angle approximating 45° with the horizontal.

Another pair of resilient clamping members 52*a* are mounted at the bottom portion of the alternative clip 48*a* terminating at their forward portion in up-turned lips 54*a* which resiliently receive and secure the bottom ridge 70*a* of the brick unit 10*a*. The bottom portion of the clamping member 52*a* is angled with the back of the clip or vertical at an angle (G) approximating 75° giving it a downward slope of 15°. The forward lip 54*a* angles upwardly from the bottom portion of the clamp 52*a* at an angle ($h$) approximating 60° or 45° with the horizontal. It will be further noted that an angle ($i$) is formed by the forward sloping of the bottom lug 34*a* at an angle of approximately 6° with the vertical or the plane of the back of the clip 24*a*. A punched-out circular portion 58*a* is provided in the main body of the clip to act as a mortar key similarly as in the other form of clip described earlier.

*Tolerance accommodation*

Figure 13:
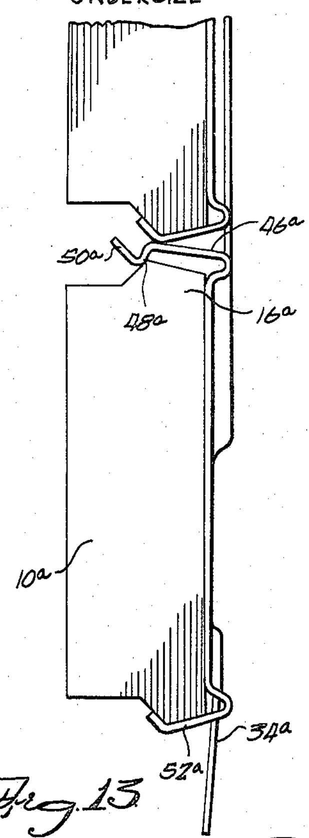
Figure 14:
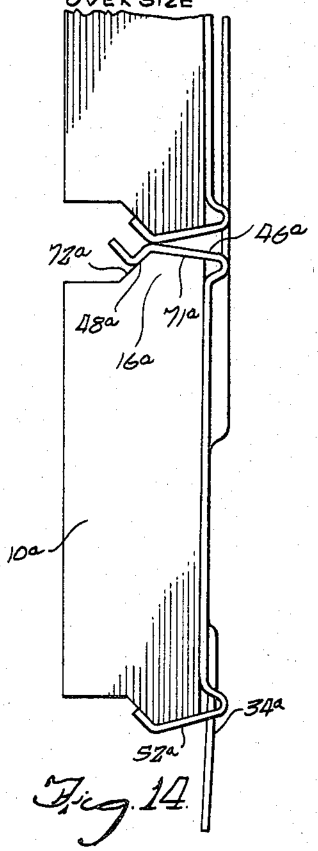

The alternative brick unit and clip co-operative adjustment to a variation in rib ridge widths is best illustrated in Figs. 12, 13 and 14, showing respectively a normal, undersized and oversized brick unit.

In Fig. 12, the normal size brick unit 10 is shown secured with an alternative form clip 24*a*. The bottom ridge 70*a* and its adjacent sloping faces 71*a*, 72*a* firmly abut the resilient clamp 52*a* and its forward flange 54*a*. The upper ridge 70*a* is engaged by the lip 48*a* of the top clamp 46*a*, a space being left between the upper clamp 46*a* and the rear sloping face 71*a* of the top rib 16*a* of the brick unit 10*a*.

If the brick unit 10*a* is oversized, as illustrated in Fig. 14, the forward clamp 46*a* is deformed further upwardly until the rear face 71*a* of the rib 16*a* of the brick unit 10*a* is in full contact with the clamping member. The down-turned lip 48*a* similarly contacts the forward sloping face 72*a* of the ridge 16*a* of the brick unit 10*a*.

In the case of an undersized brick unit 10*a*, such as illustrated in Fig. 13, the rib 16*a* is engaged principally by the angular junction between the lip 48*a* and up-turned flange 50*a* of the clamp 46*a*.

In each of the instances of a normal, undersized, oversized brick 10*a*, the bottom ridge is in firm contact with the bottom clamping member 52*a*. The top clamping member 46*a*, however, is resiliently deformed to accommodate the variation in width of the brick unit 10*a*. The bottom lug 34*a* slopes forward a sufficient distance to contact the back of the adjacent brick unit, thereby providing additional resilient contact between the clip, wall, and brick unit.

*The mortar*

In order to further mechanize the operation of laying the brick veneer, a mortar composition has been developed which permits its being mechanically applied to the interstices between the clay brick units 14.

The mortar for this application must be susceptible of being extruded through the nozzle of a caulking gun. Thus, the mortar must be more plastic and viscous than the mortar more commonly used by masons. In addition, ordinary mortar will compact in a caulking gun, and increased pressure on the piston serves only to squeeze additional water from the mortar and reduce the remaining mortar to an even less plastic and more unworkable form. Masons' lime will not form a viscous enough paste to make an extrudible mortar of adequate strength.

Consequently, it has been necessary to develop a mortar which can be extruded through a gun or other pressure means which will remain homogeneous in its viscous form, and possess satisfactory weathering and strength characteristics when applied. Because the veneer type wall as contemplated by the invention is not primarily a structural element, the strength of the mortar is secondary to the weathering characteristics which it must exhibit.

Porous or moderately compacted sand is about 30–35% voids. Mortar is generally formulated to have one volume of paste (cement plus plasticizer) to three volumes of sand. This mixture is economical because it provides merely the minimum amount of paste that will coat all the sand grains. Also, because there is not an excess of paste in a three to one mixture, there is little shrinkage. To avoid shrinkage, the mortar generally should not be "fatter" than one volume of paste to 2.4 volumes of sand.

Figure 16:
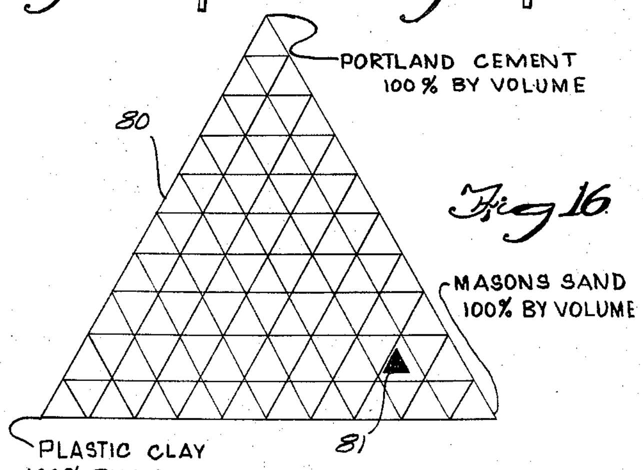
Fig. 16 is a triaxial diagram of the ingredients of a unique mortar showing its optimum composition for use in applying the veneer wall illustrative of the invention.

In preparing a suitable mixture for extrusion to be applied to the novel type wall of the present invention, a commonly used mortar composition was prepared from 1 volume of cement, 1 volume of hydrated lime, and 6 volumes of masons' sand. This 1-1-6 mixture would not extrude. It has been found, however, that by substituting a plastic clay for the hydrated lime, volume for volume, a much more workable mix may be achieved. To achieve greater plasticity, a reduction of the sand/paste ratio from 3/1 to 2.4/1 has proved successful. This results in a mix with a 1-1-6, 1-1.5-6, and 1.5-1-6 limitation on the extremes of a triaxial diagram 80 such as shown in Fig. 16. Within the confines of the shaded portion 81 of the triaxial diagram shown in Fig. 16, field experimentation will show the most satisfactory ratios for the particular application.

By following the same technique, an appropriate ratio of polyvinyl acetate or latex may be developed by one skilled in the art to complete an extrudible mortar mix for use in application in a veneer wall type construction such as contemplated by the invention. The appropriate proportions for additional palsticizers may be found in this manner.

The following examples illustrate the types of mortars that may be prepared:

*Example 1.*—10 lbs. of sand were mixed with 4⅛ lbs. Portland cement and .333 lb. of .55% solid polyvinyl acetate emulsion. Sufficient water was added to bring the mortar to a working consistency. The mortar was then placed in a caulking gun and worked into the interstices between the bricks and subsequently smoothed with a grooving tool. Appropriate steps were taken to keep air entrained in the mixture and to maintain the water content at a constant level. Observation after several months showed that the mortar had not shrunk or developed evidences of cracking.

*Example 2.*—Mortar was prepared of the following mixture: 17.2% Portland cement (by weight); 9.4% ground plastic clay; 73.4% sand. (Calcium-ligno-sulphonate was added in an amount equal to 1% of the weight of the cement). The workability of the ground clay plasticized mortar was satisfactory in operation and the weathering was satisfactory.

By using a plasticizer not exceeding 10% by weight the mixture of dry ingredients of the mortar, the basic strength and weathering characteristics of the mortar are not extensively altered, while the extrudability and workability of the mortar is greatly improved. Greater amounts of plasticizer have been found to reduce the weathering characteristics, and a lesser amount of plasticizer correspondingly reduces the workability of the mortar.

We claim as our invention:

1. In an assembly forming a veneer for a vertically disposed wall, the combination of a plurality of generally flat rectangular bricks arranged in a horizontal row and each having longitudinal ribs extending along its top and bottom edges at the rear of the brick, each of said ribs having forward and rear faces sloping at angles of approximately 45 degrees and 15 degrees respectively relative to the horizontal and intersecting at a ridge located substantially one-third of the thickness of the brick from the rear face, and mounting clips having backs secured to the wall behind adjacent ends of adjacent ones of said bricks and spaced apart horizontally distances equal to the spacing of the centers of adjacent bricks and horizontally spaced pairs of upper and lower clamping members resiliently hooking around and clamping against said ribs on the adjacent ends of the adjacent bricks, each lower clamping member of each of said pairs having a first portion sloping downwardly at an angle of approximately 15 degrees relative to the horizontal and a lip portion extending upwardly from the first portion relative to the horizontal at an angle of approximately 45 degrees and the upper clamping member having a first portion projecting substantially horizontally, a lip portion extending downwardly at an angle of approximately 60 degrees relative to the first portion and an upwardly projecting outer portion adapted to be engaged by the upper rib of a brick while its other rib is seated in the lower clamping member.

2. For use in forming a veneer wall, the combination of a generally flat veneer brick having longitudinal ribs extending along its upper and lower edges at the rear of the brick, each rib having sloping forward and rear faces intersecting at a ridge located approximately one-third of the thickness of the brick unit from the rear face, and a mounting clip having a back adapted to be secured in a vertical position to a wall and horizontally spaced pairs of upper and lower resilient clamping members with each pair extending outwardly from the back for clamping engagement with said ribs at one end portion of said brick, the lower clamping member having a first portion extending downwardly from said back at an angle equal to the slope of said rear face of one of said ribs so as to achieve full engagement with such face and a lip portion intersecting the first portion at the approximate angle of intersection of said rib faces and the upper member having a first portion extending outwardly at approximately a right angle, a lip portion intersecting the first portion approximately at said angle of intersection of said rib faces, and a forwardly and upwardly projecting portion adapted to be engaged and cammed upwardly by the upper rib of a brick while the other rib is seated in the lower clamping member.

3. In an assembly forming a veneer for a vertically disposed wall, the combination of a plurality of generally flat rectangular bricks arranged in a horizontal row, each brick having longitudinal ribs spaced from the front face of the brick and projecting outwardly from its top and bottom edges at the back of the brick, and a plurality of individual clips secured to the wall at a spacing equal to the spacing of the centers of the bricks in said row and each disposed behind adjacent ends of adjacent brick in the row with each clip having horizontally spaced pairs of vertically spaced upper and lower clamping lug members resiliently clamping against said ribs on the adjacent ends of the adjacent bricks so that each brick is supported at opposite ends by pairs of lug members of different individual clips, each of said clamping lug members of each of said pairs having a first portion extending laterally from the clip and resiliently flexible toward and away from the other member of the same pair and a lip portion projecting angularly from each first portion toward the other lip portion of the same pair to hook around the adjacent rib of the adjacent brick.

4. A wall veneering unit comprising, in combination, a generally flat rectangular veneer brick adapted to be supported in a horizontal position in a horizontal row of bricks and having longitudinal ribs projecting outwardly from its top and bottom edges at the back of the brick and a clip adapted to be secured to a wall in a horizontal row of clips and at a spacing from adjacent clips equal to the horizontal spacing of the centers of adjacent bricks in said row of bricks and having two horizontally spaced pairs of opposed clamping lug members each having a first portion projecting laterally from the clip and resiliently flexible toward and away from the other member of the same pair and a lip portion projecting from the first portion angularly toward the other lip portion of the same pair to hook around the end portion of the adjacent rib of a brick received between the pair of clamping members and to support such brick in spaced relation to and independently of another brick received between the other pair of clamping members of the same clip.

5. In an assembly forming a veneer for a vertically disposed wall, the combination of a plurality of generally flat rectangular bricks arranged horizontally in a horizontal row with their adjacent ends spaced apart, each of said bricks having upper and lower longitudinal edges each with forwardly and rearwardly facing surfaces intersecting at a ridge located between the front and rear faces of the brick, and a plurality of individual clips secured to the wall behind said adjacent ends of said bricks and at a spacing equal approximately to the spacing of the centers of the bricks and each having a back and horizontally spaced pairs of vertically spaced upper and lower lugs projecting from back and hooked around and clamped against said ridges of the adjacent ends of the bricks so that each brick is supported independently at opposite ends by pairs of lugs of different individual clips, each of said lugs of each of said pairs of each clip having a portion extending laterally of said back of the clip across said rearwardly facing surface of the adjacent ridge and then toward the other lug of the same pair and into engagement with said forwardly facing surface of the same ridge.

References Cited in the file of this patent

UNITED STATES PATENTS

| | | |
|---|---|---|
| 1,521,967 | Powers | Jan. 6, 1925 |
| 1,975,769 | Cederholm | Oct. 9, 1934 |
| 2,011,510 | Ackenbrack | Aug. 13, 1935 |
| 2,043,706 | Myers | June 9, 1936 |
| 2,054,512 | Kerner | Sept. 15, 1936 |
| 2,065,510 | Bennett | Dec. 29, 1936 |
| 2,088,625 | Wallace | Aug. 3, 1937 |
| 2,093,261 | Willson | Sept. 14, 1937 |
| 2,103,569 | Wallace et al. | Dec. 28, 1937 |
| 2,164,871 | Eichenlaub | July 4, 1939 |
| 2,183,450 | Filangeri | Dec. 12, 1939 |
| 2,195,910 | Welch | Apr. 2, 1940 |
| 2,528,205 | Benevento | Oct. 31, 1950 |